(12) United States Patent
Osaka

(10) Patent No.: US 8,314,757 B2
(45) Date of Patent: Nov. 20, 2012

(54) APPARATUS FOR DRIVING LIGHT EMITTING ELEMENTS AND ELECTRONIC APPLIANCE EMPLOYING THE APPARATUS

(75) Inventor: Syohei Osaka, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 916 days.

(21) Appl. No.: 12/169,188

(22) Filed: Jul. 8, 2008

(65) Prior Publication Data

US 2009/0146932 A1 Jun. 11, 2009

(30) Foreign Application Priority Data

Dec. 10, 2007 (JP) ................................ 2007-318011

(51) Int. Cl.
*G09G 3/32* (2006.01)

(52) U.S. Cl. ............... 345/82; 345/55; 345/83; 345/84; 345/102; 315/169.1; 315/169.3; 362/97.3

(58) Field of Classification Search ............... 345/169.3, 345/55, 82–84, 87, 102; 315/169.1, 169.3; 362/97.1–97.3
See application file for complete search history.

(56) References Cited

U.S. PATENT DOCUMENTS 5,831,605 A * 11/1998 Yasui et al. ............... 345/211
2004/0208011 A1 * 10/2004 Horiuchi et al. ........... 362/458

FOREIGN PATENT DOCUMENTS

| JP | 2003-152224 | 5/2003 |
|---|---|---|
| JP | 2003-332624 | 11/2003 |
| JP | 2005-260110 | 9/2005 |
| JP | 2006-319057 | 11/2006 |
| JP | 2006-339298 | 12/2006 |
| JP | 2007-42758 | 2/2007 |
| JP | 2007-123627 | 5/2007 |
| JP | 2007-281263 | 10/2007 |

* cited by examiner

*Primary Examiner* — Amare Mengistu
*Assistant Examiner* — Insa Sadio
(74) *Attorney, Agent, or Firm* — Oblon, Spivak, McClelland, Maier & Neustadt, L.L.P.

(57) ABSTRACT

An apparatus for driving light emitting elements includes a constant-current driver arranged for each of arrays of light emitting elements including a constant-current drive element and a current regulator; a first selector configured to select one having a highest signal level from among control signals of the constant-current drivers and output the selected control signal; a second selector configured to select a lowest one from among output voltages of the constant-current drivers and output a signal representative of the selected output voltage; a differential amplifier configured to output an amplified differential signal that is obtained by amplifying a difference between the signals output from the first and second selectors; and a power source circuit configured to control, according to the amplified differential signal, a voltage supplied to a second end of each of the arrays of light emitting elements.

7 Claims, 9 Drawing Sheets

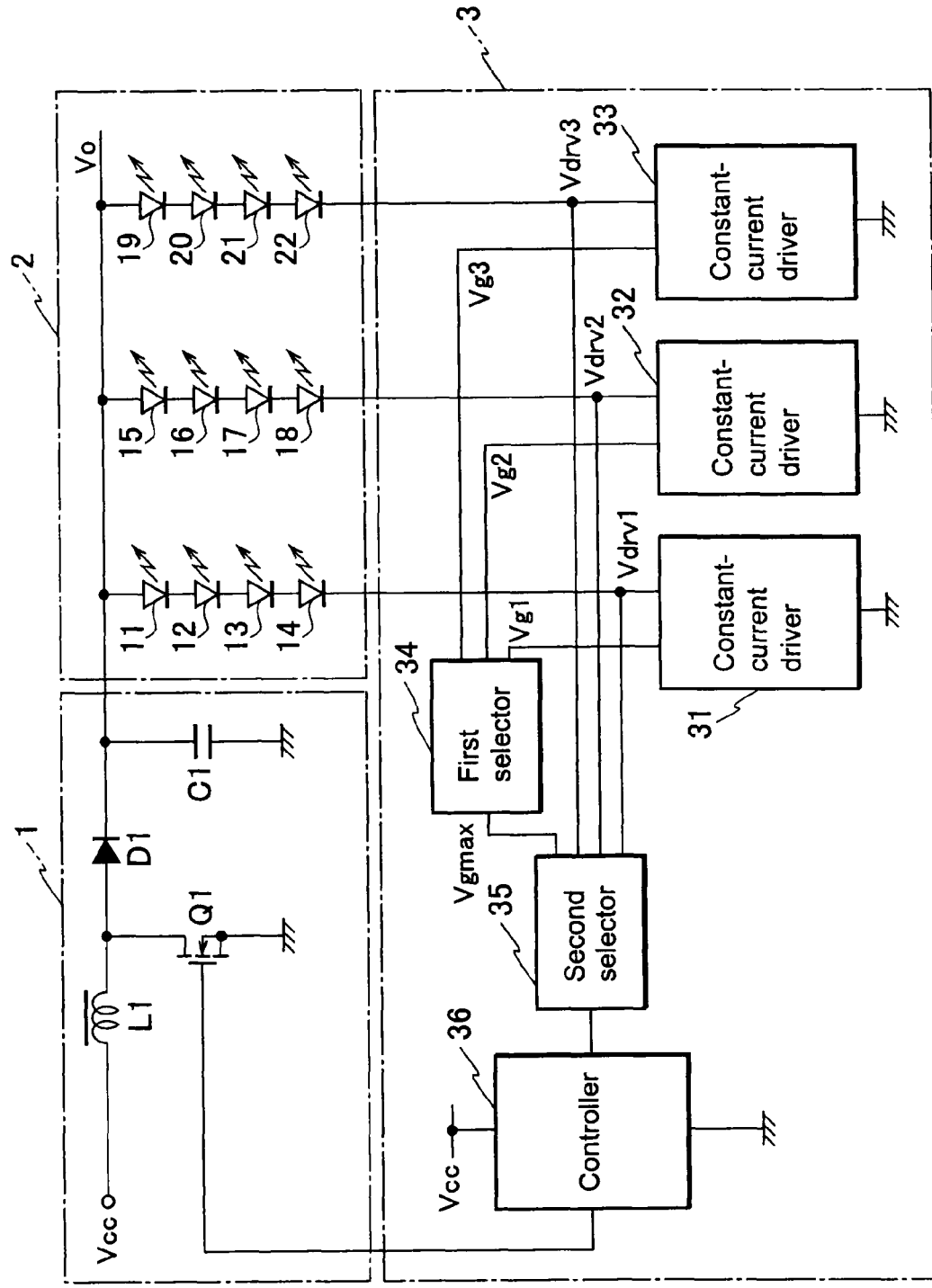

APPARATUS FOR DRIVING LIGHT EMITTING ELEMENTS AND ELECTRONIC APPLIANCE EMPLOYING THE APPARATUS

BACKGROUND OF THE INVENTION

1. Field of the Invention

The present invention relates to an apparatus for driving light emitting elements such as LEDs at high voltage, and also, to an electronic appliance employing such an apparatus.

2. Description of the Related Art

FIG. 1 shows an apparatus for driving light emitting elements disclosed in Japanese Unexamined Patent Application Publication No. 2003-332624. The apparatus shown in FIG. 1 includes arrays of light emitting elements 121 to 126, constant-current drivers 112, 113, and 114 to which first ends of the arrays of light emitting elements are connected, respectively, a selector 118 to select a lowest one from among voltages applied to the constant-current drivers 112, 113, and 114, and a power source circuit 127 to compare the selected voltage from the selector 118 with a reference voltage, provide an amplified differential signal according to the comparison result, and regulate an output voltage to be applied to second ends of the rows of light emitting elements.

The constant-current drivers 112, 113, and 114 employ active elements such as transistors or MOSFETs to pass constant currents through the light emitting elements 121 to 126. The active elements each have three terminals, i.e., an emitter, a collector, and a base, or a gate, a drain, and a source.

In a case where the active element is a transistor, a current passing through the collector and emitter thereof is controllable with a current passing through the base and emitter thereof. In another case where the active element is a MOSFET, a current passing through the drain and source thereof is controllable with a voltage applied between the gate and source thereof. The transistor has a characteristic that, even if the base current is unchanged, the collector current changes if a voltage applied between the collector and emitter of the transistor changes. The MOSFET has a characteristic that, even if the gate voltage is unchanged, the drain current changes if a voltage applied between the drain and source of the MOSFET changes.

The transistor differently operates in a saturation region and an active region. In the saturation region, the collector current changes depending on the collector-emitter voltage irrespective of a control signal applied to the control terminal (base terminal). In the active region, the collector current changes depending on the control signal irrespective of the collector-emitter voltage. Similarly, the MOSFET differently operates in a linear region and an active region. In the linear region, the drain current changes depending on the drain-source voltage irrespective of a control signal applied to the control terminal (gate terminal). In the active region, the drain current changes depending on the control signal irrespective of the drain-source voltage.

The apparatus for driving light emitting elements according to the related art includes a predetermined margin in the reference voltage so that the constant-current drive elements such as transistors or MOSFETs may always operate in the active region, and on that basis, the related art makes the lowest voltage selected by the selector 118 agree with the reference voltage.

SUMMARY OF THE INVENTION

According to the related art explained with reference to FIG. 1, a current provided by each constant-current driver is restricted by the reference voltage and the characteristics of each constant-current drive element. To cancel the characteristics of the constant-current drive elements, the related art should include a sufficient margin in the reference voltage. This results in applying a voltage more than necessary to each constant-current driver, thereby deteriorating the efficiency of the apparatus and increasing the temperature of the constant-current driver.

In addition, the reference voltage of the related art limits a maximum current the constant-current driver can control. This means that, when the apparatus is used in a situation that needs short pulses of large current, each constant-current drive element should have a large capacity to increase the cost of the apparatus.

According to the present invention, an apparatus for driving light emitting elements that is highly efficient, high quality, and inexpensive can be provided.

According to a first aspect of the present invention, provided is an apparatus for driving light emitting elements, including a constant-current driver arranged for each of one or more arrays of light emitting elements, connected to a first end of the array of light emitting elements, and including a constant-current drive element and a current regulator, the current regulator turning on/off the constant-current drive element with a control signal to regulate a current of the constant-current drive element; a first selector configured to select one having a highest signal level from among the control signals of the constant-current drivers and output the selected control signal; a second selector configured to select a lowest one from among output voltages of the constant-current drivers and output a signal representative of the selected output voltage; a differential amplifier configured to output an amplified differential signal that is obtained by amplifying a difference between the signals output from the first and second selectors; and a power source circuit configured to control, according to the amplified differential signal, a voltage supplied to a second end of each of the arrays of light emitting elements.

According to a second aspect of the present invention that is based on the first aspect, the first selector includes a switch element arranged for and connected in parallel with the constant-current drive element of each of the constant-current drivers, a control terminal of the switch element receiving the control signal for the constant-current drive element. The first selector is configured to select one having a highest signal level from among the control signals of the constant-current drivers and output a signal that is lower than the selected control signal by a threshold value of the switch element.

According to a third aspect of the present invention that is based on the first aspect, if a terminal voltage of the constant-current drive element is sufficient to operate the constant-current drive element in an active region with respect to the drive current of the constant-current driver, the differential amplifier operates in such a way as to minimize the amplified differential signal and the power source circuit controls, according to the amplified differential signal, the terminal voltage of the constant-current drive element so that the constant-current drive element keeps operating in the active region.

A fourth aspect of the present invention provides an electronic appliance that employs the apparatus for driving light emitting elements of any one of the above-mentioned aspects.

BRIEF DESCRIPTION OF THE DRAWINGS

FIG. 2 is a circuit diagram illustrating an apparatus for driving light emitting elements according to a first embodiment of the present invention;

DESCRIPTION OF THE PREFERRED EMBODIMENTS

Figure 1:
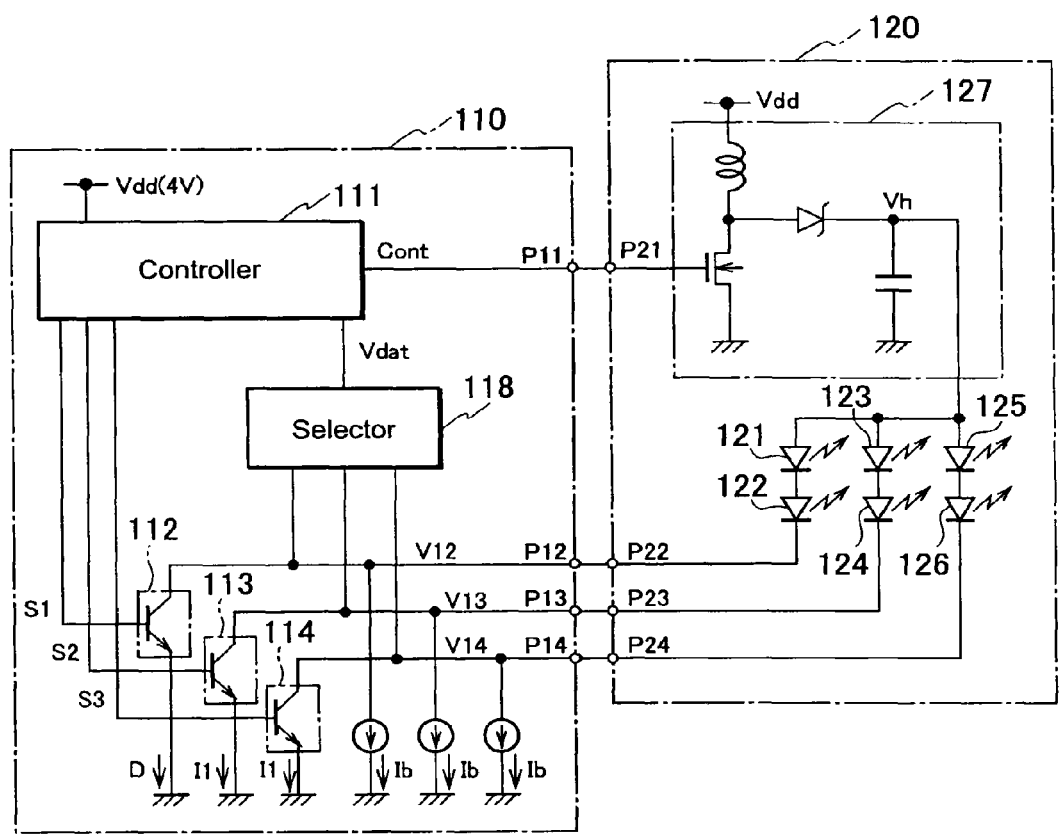
FIG. 1 is a circuit diagram illustrating an apparatus for driving light emitting elements according to the related art.

Apparatuses for driving light emitting elements according to embodiments of the present invention and electronic appliances employing such apparatuses will be explained in detail.

First Embodiment

FIG. 2 is a circuit diagram illustrating an apparatus for driving light emitting elements according to the first embodiment of the present invention. In FIG. 2, the apparatus includes a power source circuit 1, a light emitting element section 2, and a light emitting element drive section 3.

The power source circuit 1 includes a first series circuit and a rectify-smooth circuit. The first series circuit is connected between an input power source Vcc and the ground and includes a step-up reactor L1 and a switching element Q1 such as a MOSFET. The rectify-smooth circuit is connected in parallel with the switching element Q1 between the drain and source thereof and includes a rectifying diode D1 and a smoothing capacitor C1.

The light emitting element section 2 includes three arrays of light emitting elements, i.e., an array of series-connected four light emitting elements 11 to 14, an array of series-connected four light emitting elements 15 to 18, and an array of series-connected four light emitting elements 19 to 22. A first end of each row of light emitting elements is connected to an output end of the power source circuit 1, i.e., a first end of the smoothing capacitor C1.

Second ends of the three arrays of light emitting elements 11 to 14, 15 to 18, and 19 to 22 are connected to three constant-current drivers 31 to 33, respectively. Although the number of arrays of light emitting elements is three according to the first embodiment, any number of arrays of light emitting elements is adoptable according to the present invention.

The light emitting element drive section 3 includes the three constant-current drivers 31 to 33, a first selector 34, a second selector 35, and a controller 36.

The first selector 34 is connected to the three constant-current drivers 31 to 33 and selects a maximum one from among three control signals for three constant-current drive elements of the three constant-current drivers 31 to 33.

The second selector 35 is connected to output ends of the constant-current drivers 31 to 33, detects applied voltages of the constant-current drivers 31 to 33, selects a lowest one from among the detected three voltages, finds a difference between the selected lowest voltage and the control signal of maximum value selected by the first selector 34, amplifies the difference into an amplified differential signal, and outputs the amplified differential signal to the controller 36.

According to the amplified differential signal from the second selector 35, the controller 36 turns on/off the switching element Q1 to control an output voltage Vo of the power source circuit 1.

Figure 3A:
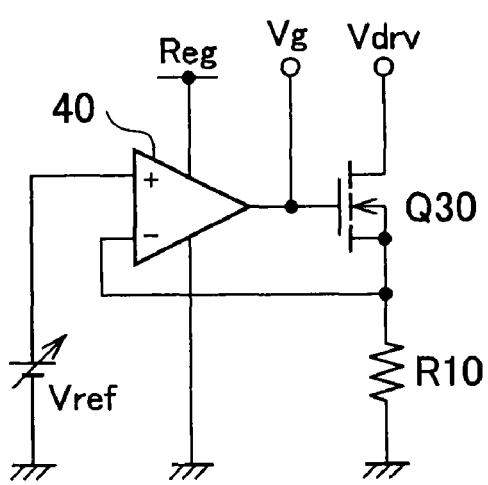
FIGS. 3A and 3B are views illustrating examples of a constant-current driver arranged in the apparatus of FIG. 2.
Figure 3B:
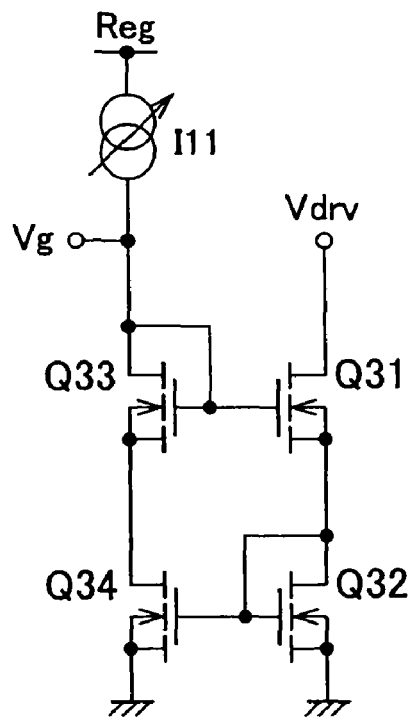

FIGS. 3A and 3B illustrate examples of the constant-current driver (31, 32, or 33) as illustrated in FIG. 2. In FIG. 3A, the constant-current driver includes an n-type MOSFET Q30, a current regulating resistor R10, an operational amplifier 40, and a reference power source Vref whose voltage is variable. A series circuit of the n-type MOSFET Q30 and current regulating resistor R10 is connected between the output terminal and ground of the constant-current driver 31 (32, 33).

The operational amplifier 40 has a non-inverting input terminal connected to the reference power source Vref, an inverting input terminal connected to a connection point of the source of the n-type MOSFET Q30 and the current regulating resistor R10, and an output terminal connected to a gate of the n-type MOSFET Q30. The gate of the n-type MOSFET Q30 has a gate voltage Vg.

In FIG. 3A, the operational amplifier 40 controls the gate voltage Vg of the n-type MOSFET Q30 in such a way as to cancel a voltage difference between the non-inverting input terminal and inverting input terminal of the operational amplifier 40. This circuit is a voltage follower configuration. A resistance value of the current regulating resistor R10 and the reference power source Vref determine a current passing through the constant-current driver 31 (32, 33) in a manner of Vref/R10. As the resistor R10 has a fixed resistance and the reference power source Vref increases, a drain current Id of the n-type MOSFET Q30 increases. As the reference power source Vref is fixed and the resistor R10 decreases, the drain current Id of the n-type MOSFET Q30 increases. The control signal of the constant-current drive element, i.e., the gate voltage Vg of the n-type MOSFET Q30 is sent to the first selector 34.

In FIG. 3B, the constant-current driver includes a series circuit consisting of n-type MOSFETs Q31 and Q32 connected between an output terminal Vdrv of the constant-current driver 31 (32, 33) and the ground. Also included is a series circuit of a constant-current source I11 and n-type MOSFETs Q33 and Q34 connected between a power source Reg and the ground. Gate terminals of the n-type MOSFETs Q31 and Q33 are connected to each other. The gate and drain of the n-type MOSFET Q33 are commonly connected. Gate terminals of the n-type MOSFETs Q32 and Q34 are connected to each other. The gate and drain of the n-type MOSFET Q32 are commonly connected.

In the constant-current driver of FIG. 3B, the constant current source I11 is connected to a reference side of the n-type MOSFETs Q31, Q33, Q32, and Q34 those form a current mirror configuration. With respect to a reference current from the constant current source I11, the n-type MOSFETs Q31 and Q32 pass a constant current output determined by a mirror ratio of the n-type MOSFETs Q33 and Q34 to the n-type MOSFETs Q31 and Q32. A gate voltage Vg of the n-type MOSFETs Q33 and Q31 is provided as a control signal of the constant-current drive elements.

Figure 4A:
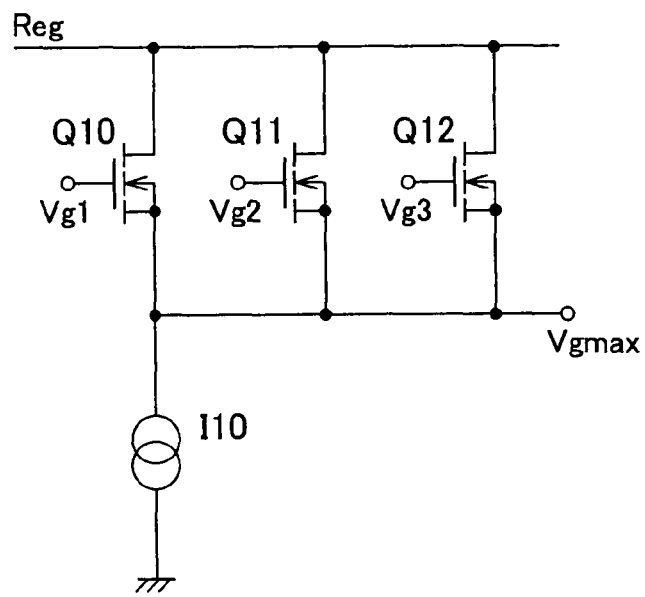
FIGS. 4A and 4B are views illustrating examples of a first selector arranged in the apparatus of FIG. 2.
Figure 4B:
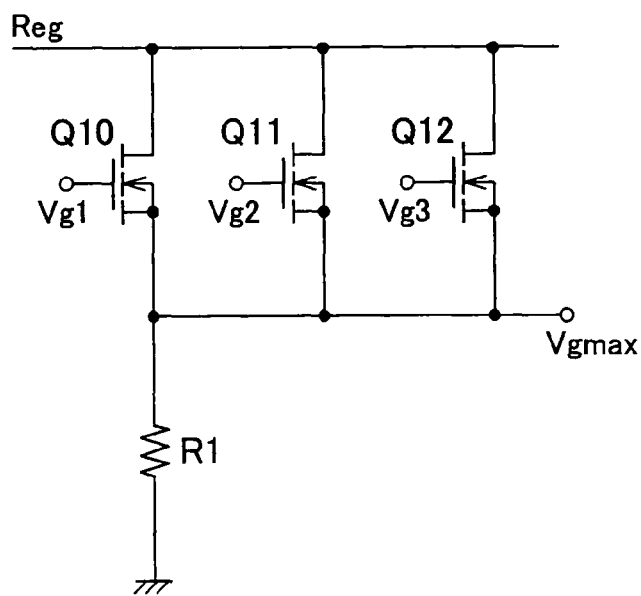

FIGS. 4A and 4B illustrate examples of the first selector 34 as illustrated in FIG. 2. In FIG. 4A, the first selector 34 includes n-type MOSFETs Q10, Q11, and Q12 and a constant current source I10. Drains of the n-type MOSFETs Q10, Q11, and Q12 are commonly connected to the power source Reg and sources thereof are commonly connected. The constant current source I10 is connected between the sources of the n-type MOSFETs Q10, Q11, and Q12 and the ground. Gate terminals of the n-type MOSFETs Q10, Q11, and Q12 are connected to the control terminals Vg of the constant-current drive elements in the constant-current drivers 31, 32, and 33, respectively.

The first selector as illustrated in FIG. 4B employs a resistor R1 instead of the constant current source I10 of the first selector shown in FIG. 4A.

According to any one of the first selectors 34 shown in FIGS. 4A and 4B, the gate terminals of the n-type MOSFETs Q10, Q11, and Q12 receive voltages Vg1, Vg2, and Vg3, respectively, that may differ from one another. Due to an amplification action of MOSFETs, only the MOSFET that receives a highest voltage at the gate terminal thereof operates and the other MOSFETs do not operate. The MOSFET that receives a highest voltage at the gate thereof outputs a selected signal Vgmax that is a voltage lower than the received highest voltage Vg by a gate-source voltage Vgs of the MOSFET. The signals Vg1, Vg2, and Vg3 received by the gate terminals of the MOSFETs Q10, Q11, and Q12 of the first selector 34 are control signals for the constant-current drive elements of the constant-current drivers 31, 32, and 33.

Figure 5A:
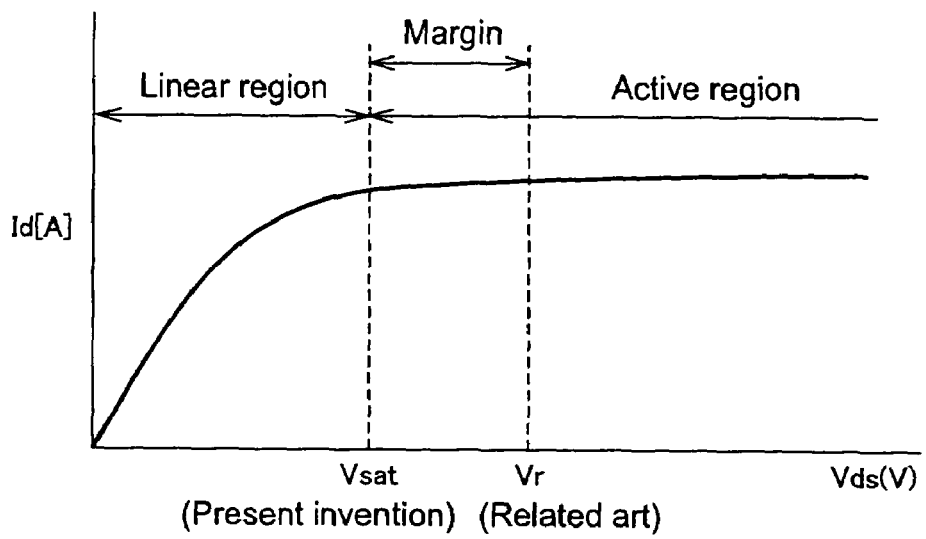
FIGS. 5A and 5B are characteristic curves illustrating operation of the constant-current driver arranged in the apparatus of FIG. 2.
Figure 5B:
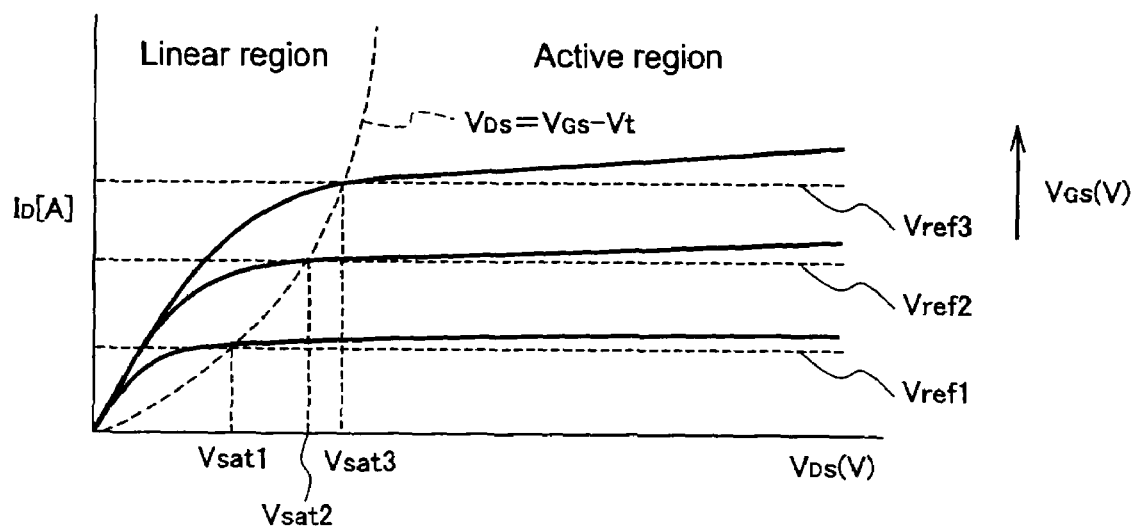

FIGS. 5A and 5B are characteristic curves illustrating operation of the constant-current driver 31 (32, 33) as illustrated in FIG. 2. The characteristic curve illustrated in FIG. 5A indicates a drain current Id of the MOSFET Q30 as a function of a drain-source voltage Vds under a condition of the gate terminal voltage Vg being constant.

In FIG. 5A, an abscissa indicates the drain-source voltage Vds and an ordinate indicates the drain current Id. Operation of the MOSFET Q30 can be classified into a linear region in which the drain current Id linearly changes according to changes in the drain-source voltage Vds and an active region in which the drain current Id is substantially unchanged irrespective of changes in the drain-source voltage Vds. Based on this characteristic, the constant current driver 31 (32, 33) regulates the control signal Vg for the constant-current drive element Q30 according to an applied voltage.

In the linear region in which the drain-source voltage is low, the drain current Id is insufficiently low. Accordingly, the constant-current driver 31 (32, 33) operates to increase the control signal Vg for the constant-current drive element Q30, thereby increasing the maximum gate voltage Vgmax.

In the active region in which the drain-source voltage Vds is sufficiently high, the drain current Id is controllable by controlling the gate voltage Vg. To make the constant-current driver 31 (32, 33) achieve a constant-current operation, a voltage that is sufficient to keep the constant-current drive element Q30 in the active region should be applied to the constant-current drive element Q30. At this time, the source voltage of the MOSFET serving as the constant-current drive element Q30 and the output voltage of the first selector 34 establish the following relationship:

$$Vgmax = Vsdrv + (Voddrv + Vtdrv) - (Vodsen + Vtsen) \quad (1),$$

where Vsdrv is a source voltage of the MOSFET Q30 (Q31), Voddrv is a gate-source overdrive voltage of the MOSFET Q30 (Q31), Vtdrv is a gate-source threshold voltage of the MOSFET Q30 (Q31), Vodsen is a gate-source overdrive voltage of the MOSFET Q10 (Q11, Q12) of the first selector 34, and Vtsen is a gate-source threshold voltage of the MOSFET Q10 (Q11, Q12). If the MOSFET Q30 (Q31) serving as the constant-current drive element of the constant-current driver 31 (32, 33) and the MOSFET Q10 (Q11, Q12) serving as the switch element of the first selector 34 have equivalent characteristics, the gate-source threshold voltages Vt of these MOSFETs will cancel each other to establish the following relationship:

$$Vgmax = Vsdrv + (Voddrv - Vodsen) \quad (2).$$

The drain current of the MOSFET Q10 (Q11, Q12) of the first selector 34 is limited by the constant current source I10 (resistor R1), and therefore, the voltage Vodsen becomes sufficiently low. The voltage Voddrv is determined by the voltage applied to the constant-current driver 31 (32, 33) and a drive current. If a sufficient voltage is applied to the constant-current driver 31 (32, 33), the voltage Voddrv is substantially determined by the drive current.

Namely, the voltage Vgmax is equal to an overdrive voltage difference due to a current density difference between the MOSFET Q30 (Q31) and the MOSFET Q10 (Q11, Q12) plus the source voltage of the MOSFET Q30 (Q31).

Figure 6:
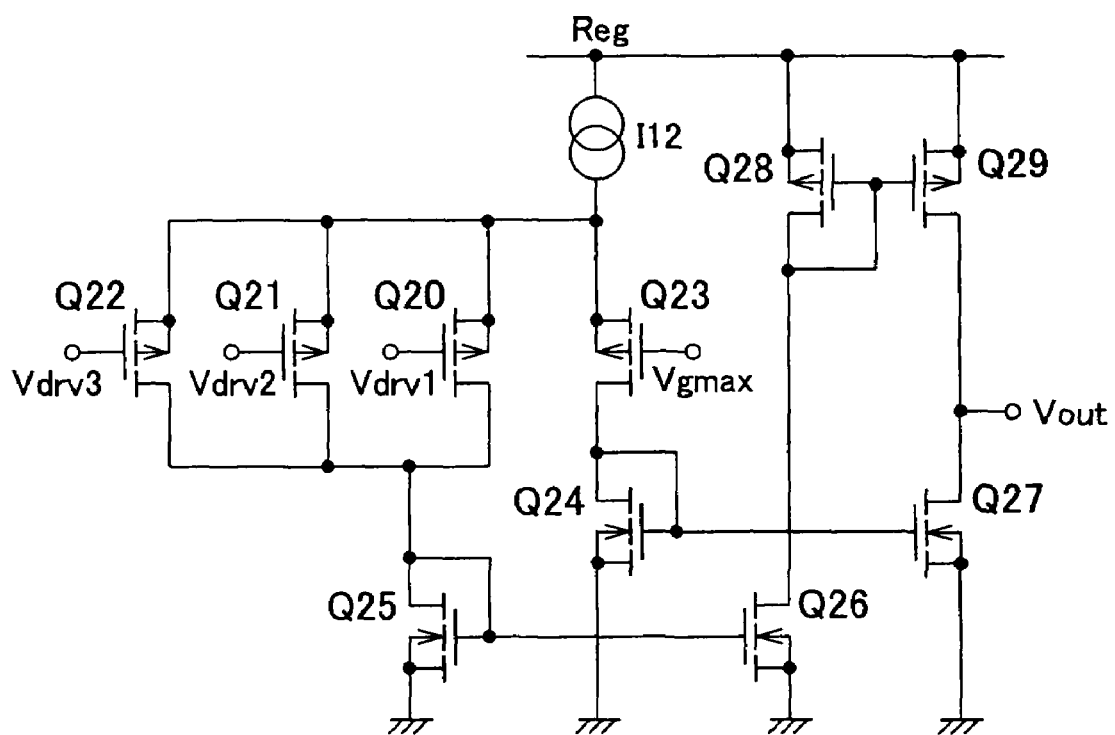
FIG. 6 is a view illustrating an example of a second selector arranged in the apparatus of FIG. 2.

FIG. 6 illustrates an example of the second selector 35 shown in FIG. 2. In FIG. 6, the second selector 35 includes a series circuit that is connected between the power source Reg and the ground and includes a constant current source I12, a p-type MOSFET Q23, and an n-type MOSFET Q24. Also connected between the power source Reg and the ground are a series circuit composed of a p-type MOSFET Q28 and an n-type MOSFET Q26 and a series circuit of a p-type MOSFET Q29 and an n-type MOSFET Q27.

P-type MOSFETs Q20, Q21, and Q22 are connected in parallel with one another and gates thereof receive voltages Vdrv1, Vdrv2, and Vdrv3, respectively, that are applied to the constant-current drivers 31, 32, and 33, respectively. The parallel circuit of the p-type MOSFETs Q20, Q21, and Q22 is connected through the constant current source I12 to the power source Reg and is connected through an n-type MOSFET Q25 to the ground.

The gate and drain of the n-type MOSFET Q25 and the gate of the n-type MOSFET Q26 are connected to one another to form a current mirror configuration. The gate and drain of the n-type MOSFET Q24 and the gate of the n-type MOSFET Q27 are connected to one another to form a current mirror configuration. The gate and drain of the p-type MOSFET Q28 and the gate of the p-type MOSFET Q29 are connected to one another to form a current mirror configuration.

The gate of the p-type MOSFET Q23 receives the output voltage Vgmax of the first selector 34. The second selector 35 selects a lowest one of the voltages Vdrv1, Vdrv2, and Vdrv3 applied to the p-type MOSFETs Q20, Q21, and Q22, compares the selected voltage with the output voltage Vgmax of the first selector 34 to find a difference between them, amplifies the difference, and outputs an amplified differential signal Vout from a connection point of the p-type MOSFET Q29 and n-type MOSFET Q27.

Figure 7:
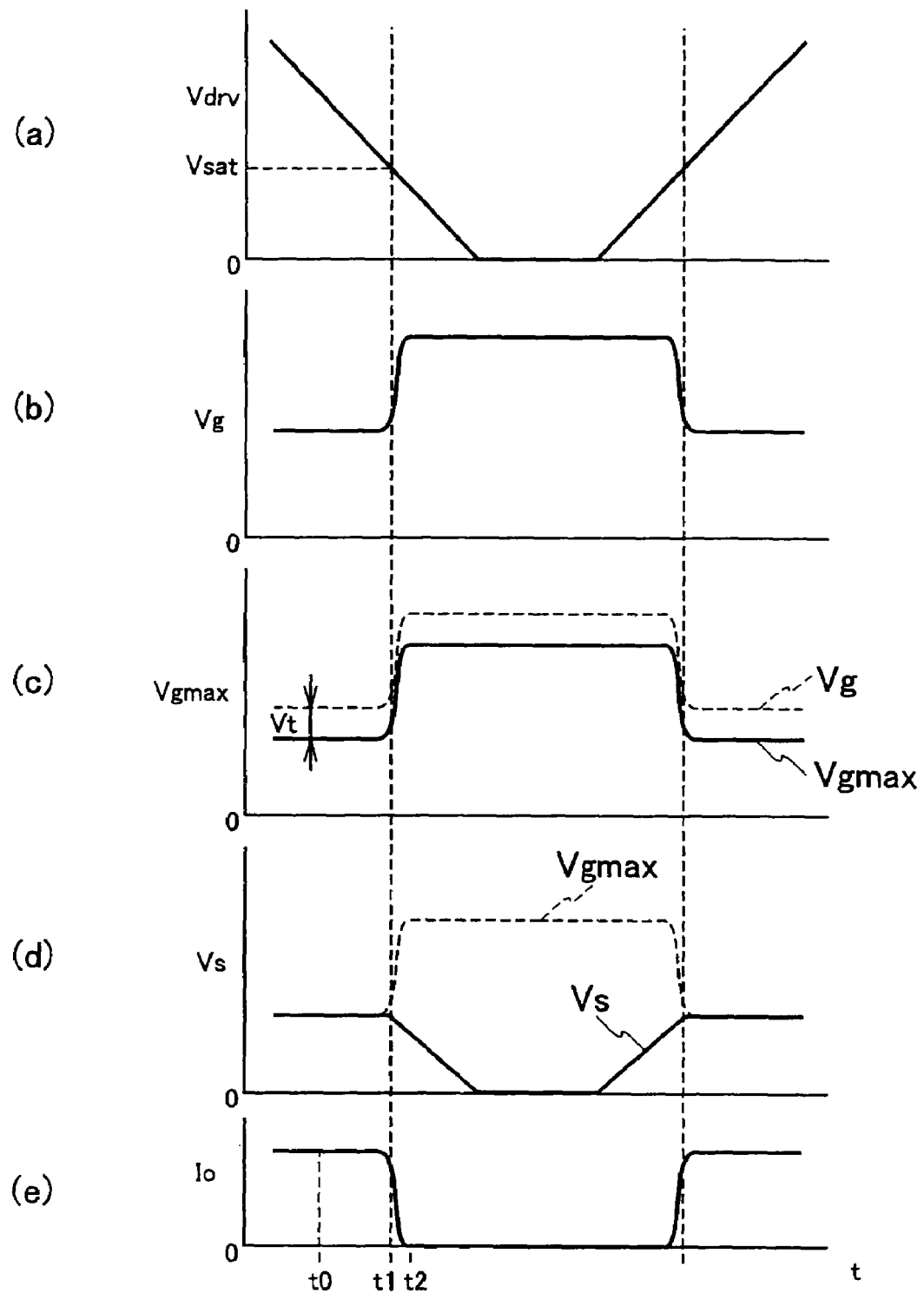
FIG. 7 is a view illustrating operational waveforms of the constant-current driver arranged in the apparatus of FIG. 2.

FIG. 7 illustrates operational waveforms as the voltage Vdrv applied to the constant-current driver 31 (32, 33) is changed. In FIG. 7, (a) the voltage Vdrv applied to the constant-current driver 31 (32, 33), (b) the control signal Vg of the constant-current drive element Q30, (c) the output voltage Vgmax of the first selector 34, (d) the source voltage Vs of the n-type MOSFET Q30 (Q31), and (e) the drive current Io (drain current Id) of the constant-current driver 31 (32, 33) are illustrated.

When the voltage Vdrv (FIG. 7(a)) applied to the constant-current driver 31 (32, 33) is sufficiently high (for example, at t0), the constant-current driver 31 (32, 33) properly controls the gate voltage Vg (FIG. 7(b)) of the n-type MOSFET Q30

(Q31), and therefore, the drive current Io keeps a constant value. When the voltage Vdrv (FIG. 7(a)) applied to the constant-current driver 31 (32, 33) decreases below a voltage Vsat, controlling the gate voltage Vg (FIG. 7(b)) of the n-type MOSFET Q30 (Q31) is unable to keep the drive current Io at the constant value. As a result, the drive current Io decreases (from t1 to t2).

To cope with this problem, the first selector 34 according to the first embodiment selects a highest one of the gate voltages applied to the gates of the n-type MOSFETs Q30 (Q31) of the constant-current drivers 31 to 33 and provides a voltage Vgmax that is lower than the selected gate voltage Vg by the gate-source threshold voltage Vt of the n-type MOSFET Q30.

Thereafter, the second selector 35 selects a lowest one of the voltages applied to the constant-current drivers 31 to 33 and provides an amplified differential signal according to the difference between the selected voltages Vdrv and Vgmax. The amplified differential signal is set to approach the voltage Vsat that is a minimum voltage required by the n-type MOSFET Q30 (Q31) of each of the constant-current drivers 31 to 33 for maintaining the predetermined drive current.

Namely, the predetermined drive current set for the n-type MOSFET Q30 (Q31) determines the voltage Vsat that is a boundary voltage between the linear region and active region of the n-type MOSFET Q30 (Q31). The voltage Vsat is equal to a voltage obtained by subtracting the threshold voltage Vt of the MOSFET from the gate-source voltage Vgs of the MOSFET. Namely, the voltage Vsat is equal to an overdrive voltage Vov.

The voltage Vgmax provided by the first selector 34 is substantially equal to a voltage obtained by subtracting the threshold voltage Vt from the gate voltage of the n-type MOSFET Q30 (Q31). To minimize the difference between the voltages selected by the first and second selector 34 and 35, the controller 36 controls the output voltage Vo of the power source circuit 1 according to the amplified differential signal provided by the second selector 35. Unlike the related art, the first embodiment has no need of inserting a margin between the output voltage Vsat of a constant-current driver and the reference voltage Vr thereof. This eliminates a power loss due to the margin. The apparatus for driving light emitting elements according to the first embodiment is, therefore, highly efficient, high quality, and inexpensive.

According to the first embodiment, the reference power source Vref is variable. If the resistor R10 of each of the constant-current drivers 31 to 33 is fixed and the voltage of the reference power source Vref is increased to Vref1, Vref2, Vref3, and the like, the drain current Id also increases under the control of the constant-current drivers 31 to 33. As the reference voltage is increased to Vref1, Vref2, Vref3, and the like to increase the drain current Id, a minimum voltage necessary for maintaining a set current (drain current) in the active region of the n-type MOSFET Q30 (Q31) increases to Vsat1, Vsat2, Vsat3, and the like, as shown in FIG. 5B.

The second selector 35 functions to minimize the amplified differential signal representative of the difference between the voltage Vgmax and the output voltage applied to one of the constant-current drivers 31 to 33. According to a drain current such as Id1, Id2, or Id3 (corresponding to Vref1, Vref2, and Vref3) set for the n-type MOSFET Q30 (Q31), the drain-source voltage Vds of the n-type MOSFET Q30 (Q31) is controlled to a minimum voltage Vsat1, Vsat2, or Vsat3 necessary for maintaining the set current (drain current) in the active region of the n-type MOSFET Q30 (Q31), as shown in FIG. 5B. Consequently, the apparatus for driving light emitting elements according to the first embodiment is highly efficient, high quality, and inexpensive.

Second Embodiment

Figure 8:
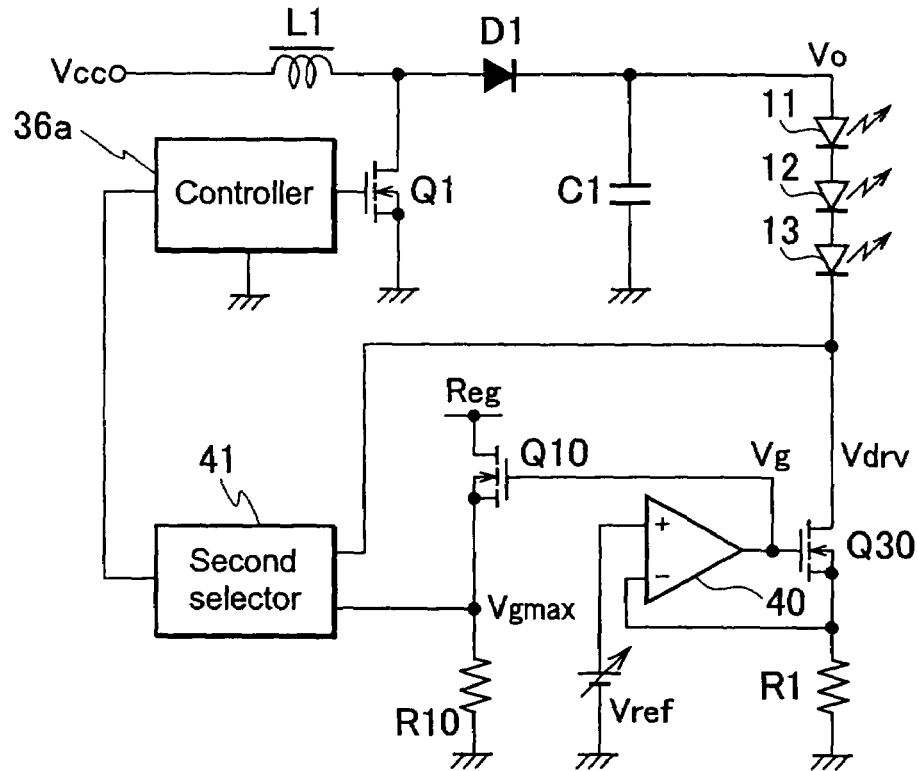
FIG. 8 is a circuit diagram illustrating an apparatus for driving light emitting elements according to a second embodiment of the present invention.

FIG. 8 is a circuit diagram illustrating an apparatus for driving light emitting elements according to the second embodiment of the present invention. A power source circuit of the apparatus according to the second embodiment has a first series circuit that is connected between an input power source Vcc and the ground and contains a step-up reactor L1 and a switching element Q1 such as a MOSFET. The power source circuit also has a rectify-smooth circuit that is connected between and in parallel with the drain and source of the switching element Q1 and includes a rectifying diode D1 and a smoothing capacitor C1.

An array of series connected three light emitting elements 11 to 13 has a first end connected to a first end of the smoothing capacitor C1. Between a second end of the array of light emitting elements and the ground, there is connected a series circuit including a MOSFET Q30 and a resistor R1. The MOSFET Q30, the resistor R1, an operational amplifier 40, and a reference power source Vref form a constant-current driver. This constant-current driver is configured like that shown in FIG. 3A, and therefore, is not explained in detail.

Between a power source Reg and the ground, there is connected a series circuit composed of a MOSFET Q10 and a resistor R10. The gate of the MOSFET Q10 is connected to the gate of the MOSFET Q30. The MOSFET Q10 detects a voltage at a control terminal of the MOSFET Q30 that forms the constant-current driver.

The MOSFET Q10 and resistor R10 form a first selector. The MOSFET Q10 has characteristics equivalent to those of the MOSFET Q30 and is connected so as to cancel a threshold voltage of the MOSFET Q30. Consequently, a source voltage of the MOSFET Q10 is equal to a drive voltage of the MOSFET Q30 minus the gate-source threshold voltage of the MOSFET Q30 and is supplied to an input terminal of a second selector 41.

A connection point between the array of light emitting elements 11 to 13 and the MOSFET Q30 is connected to another input terminal of the second selector 41. The second selector 41 also receives the output signal of the first selector. Unlike the first embodiment, the second embodiment does not have a plurality of constant-current drivers (31 to 33), and therefore, the second selector 41 handles the output voltage of the MOSFET Q30 as a minimum output voltage Vdrv of the constant-current driver and the source voltage of the MOSFET Q10 as a maximum control voltage Vgmax for the constant-current drive element Q30.

The second selector 41 generates an amplified differential signal according to the output voltage Vdrv of the constant-current driver and the maximum control voltage Vgmax of the constant-current drive element. The amplified differential signal is set to realize a necessary minimum voltage Vsat with which the MOSFET Q30 of the constant-current driver can maintain a predetermined drive current.

The voltage Vsat that is a boundary voltage between the linear and active regions of the MOSFET Q30 is determined according to a drive current set for the MOSFET Q30. The voltage Vsat is equal to an overdrive voltage Vov obtained by subtracting the threshold voltage Vt of the MOSFET from a gate-source voltage Vgs of the MOSFET. The output voltage Vgmax of the first selector is substantially equal to a voltage obtained by subtracting the threshold voltage Vt from the gate voltage of the MOSFET Q30. The second selector 41 provides a controller 36a with the amplified differential signal, and the controller 36a controls an output voltage Vo of the power source circuit in such a way as to minimize the difference between the output voltage signal Vdrv and the control signal Vgmax. Unlike the related art, the second embodiment has no need of inserting a margin between the output voltage Vsat of the constant-current driver and a reference voltage Vr. Accordingly, the apparatus for driving light emitting elements according to the second embodiment can eliminate a power loss due to the margin, and therefore, is highly efficient, high quality, and inexpensive.

First Modification

Figure 9:
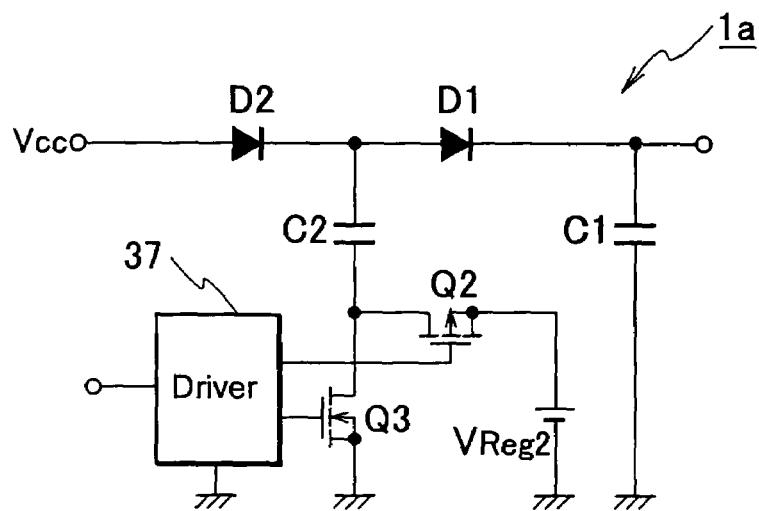
FIG. 9 is a circuit diagram illustrating a power source circuit substituting for that of the first or second embodiment, according to a first modification of the present invention.

FIG. 9 is a circuit diagram illustrating a power source circuit according to a first modification of the present invention. The power source circuit 1a shown in FIG. 9 is of a charge pump type and can substitute for the power source circuit 1 of any one of the first and second embodiments. The power source circuit 1a includes a series circuit that is connected between a power source Vcc and the ground and consists of a diode D2, a capacitor C2, and an n-type MOSFET serving as a switching element Q3.

Ends of a series circuit of the capacitor C2 and switching element Q3 are connected to a series circuit of a diode D1 and a smoothing capacitor C1. Between a connection point of the capacitor C2 and switching element Q3 and the ground, there is connected a series circuit of a p-type MOSFET serving as a switching element Q2 and a power source Vreg2. A driver 37 alternately turns on/off the switching elements Q2 and Q3. The driver 37 corresponds to the controller 36 shown in FIG. 2.

When the switching element Q3 is turned on, the capacitor C2 is charged from the power source Vcc. When the switching element Q2 is turned on, the voltage of the charged capacitor C2 and the voltage of the power source Vreg2 charge through the diode D1 the smoothing capacitor C1. The voltage of the smoothing capacitor C1 is supplied to an array of light emitting elements.

Second Modification

Figure 10:
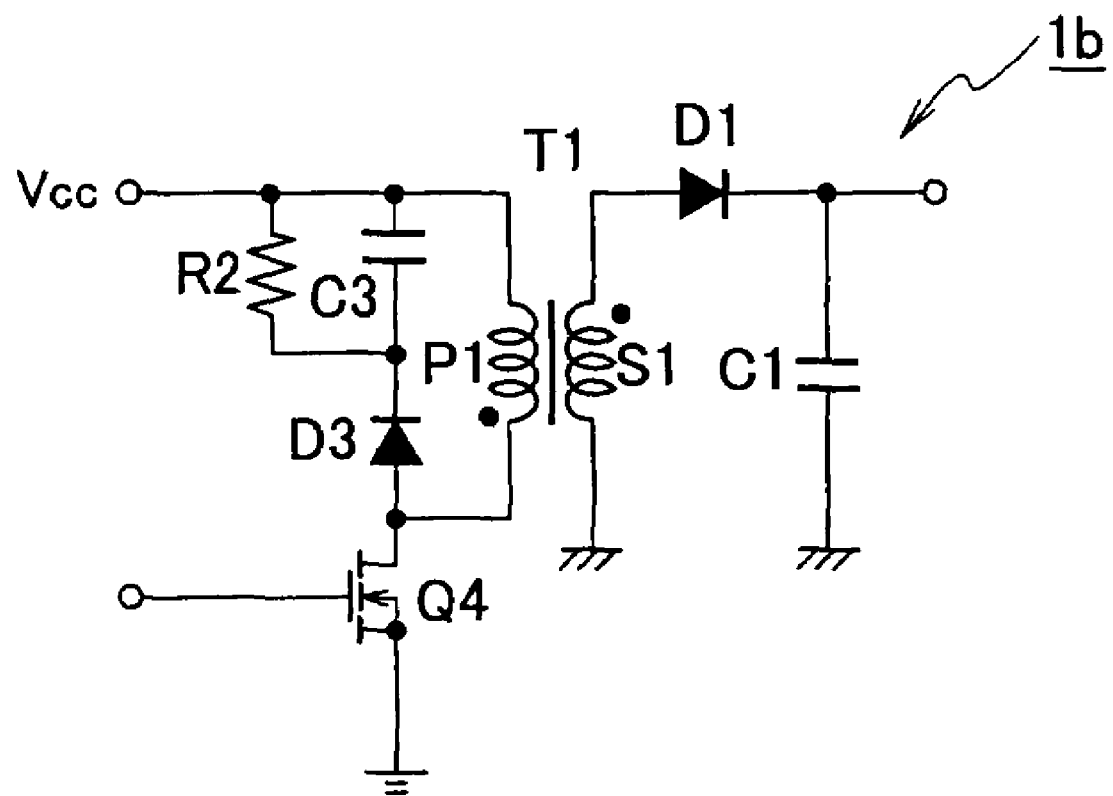
FIG. 10 is a circuit diagram illustrating a power source circuit substituting for that of the first or second embodiment, according to a second modification of the present invention.

FIG. 10 is a circuit diagram illustrating a power source circuit according to a second modification of the present invention. The power source circuit 1b as illustrated in FIG. 10 includes an insulated DC-DC converter and can substitute for the power source circuit 1 of any one of the first and second embodiments. The power source circuit 1b includes a series circuit of a primary winding P1 of a transformer T1 and an n-type MOSFET serving as a switching element Q4 and is connected between a power source Vcc and the ground.

Ends of the primary winding P1 of the transformer T1 are connected to a series circuit of a diode D3 and a capacitor C3. Ends of the capacitor C3 are connected to a resistor R2. Ends of a secondary winding S1 of the transformer T1 are connected to a series circuit of a diode D1 and a smoothing capacitor C1. A terminal voltage of the smoothing capacitor C1 is supplied as a power source voltage to an array of light emitting elements. A gate of the switching element Q4 is connected to the controller 36 shown in FIG. 2.

When the switching element Q4 is turned on, a current passes through a path extending along a positive pole of the power source Vcc, P1, Q4, and a negative pole of the power source Vcc. At this time, the diode D1 is OFF.

When the switching element Q4 is turned off, a current passes through a path extending along P1, D3, C3, and P1. At the same time, a current passes through a path extending along S1, D1, C1, and S1 to supply DC power to the smoothing capacitor C1.

The present invention is not limited to the embodiments and modifications explained above. Although the first and second embodiments employ n- and p-type MOSFETs, it is possible to employ npn transistors and pnp transistors instead of the MOSFETs.

In the first selector 34, the n-type MOSFETs Q10, Q11, and Q12 have characteristics equivalent to the characteristics of the constant-current drive elements Q30 (Q31). It is possible to include margins by employing, as the n-type MOSFETs Q10, Q11, and Q12, elements whose characteristics differ from those of the constant-current drive elements.

The apparatus of any one of the first and second embodiments can be used for an electronic appliance such as a backlight unit, a lighting unit, and a car navigator, to improve the efficiency of the electronic appliance.

The apparatus for driving light emitting elements according to the present invention can be realized by adding few devices to a conventional driver, can easily be integrated, and can be manufactured at low cost.

Effects of the Present Invention

According to the first aspect of the present invention, the first selector selects one having a highest signal level from among control signals of the constant-current drivers and the second selector selects a lowest one from among output voltages of the constant-current drivers. According to an amplified differential signal that is obtained by amplifying a difference between the signals outputted from the first and second selectors, the power source circuit controls a voltage supplied to arrays of light emitting elements. The first aspect can reduce a voltage applied to each constant-current driver, and therefore, the apparatus according to the first aspect and an electronic appliance employing the apparatus are producible at low cost.

According to the second aspect of the present invention, the first selector selects one having a highest signal level from among control signals of the constant-current drivers and output a signal that is lower than the selected control signal by a threshold value of a switch element of the first selector. According to an amplified differential signal that is obtained by amplifying a difference between the signal from the first selector and an output voltage of a constant-current drive element, the power source circuit controls a voltage supplied to arrays of light emitting elements. The second aspect can optimize and minimize a voltage applied to each constant-current driver.

According to the third aspect of the present invention, a control operation is carried out to minimize an amplified differential signal if a terminal voltage of a constant-current drive element of a constant-current driver is sufficient to operate the constant-current drive element in an active region with respect to a drive current of the constant-current driver. According to the amplified differential signal, the power source circuit controls the terminal voltage of the constant-current drive element so that the constant-current drive element keeps operating in the active region. The third aspect eliminates the need of a margin and cuts out a power loss.

This application claims benefit of priority under 35USC §119 to Japanese Patent Applications No. 2007-318011, filed on Dec. 10, 2007, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An apparatus for driving light emitting elements, comprising:
    a constant-current driver arranged for each of one or more arrays of light emitting elements, connected to a first end of the array of light emitting elements, and including a constant-current drive element and a current regulator, the current regulator turning on/off the constant-current drive element with a control signal to regulate a current of the constant-current drive element;
    a first selector configured to select one having a highest signal level from among the control signals of the constant-current drivers and output the selected control signal;
    a second selector configured to select a lowest one from among output voltages of the constant-current drivers and output a signal representative of the selected output voltage;
    a differential amplifier configured to output an amplified differential signal that is obtained by amplifying a difference between the signals outputted from the first and second selectors; and
    a power source circuit configured to control a voltage supplied to a second end of each of the arrays of light emitting elements according to the amplified differential signal.

2. The apparatus of claim 1, wherein
    the first selector includes a switch element arranged for and connected in parallel with the constant-current drive element of each of the constant-current drivers, a control terminal of the switch element receiving the control signal for the constant-current drive element; and
    the first selector is configured to select one having a highest signal level from among the control signals of the constant-current drivers and output a signal that is lower than the selected control signal by a threshold value of the switch element.

3. The apparatus of claim 1, wherein,
    when a terminal voltage of the constant-current drive element is sufficient to operate the constant-current drive element in an active region with respect to the drive current of the constant-current driver:
    the differential amplifier operates in such a way as to minimize the amplified differential signal; and
    the power source circuit controls the terminal voltage of the constant-current drive element so that the constant-current drive element keeps operating in the active region according to the amplified differential signal.

4. The apparatus of claim 2, wherein,
    when a terminal voltage of the constant-current drive element is sufficient to operate the constant-current drive element in an active region with respect to the drive current of the constant-current driver:
    the differential amplifier operates in such a way as to minimize the amplified differential signal; and
    the power source circuit controls the terminal voltage of the constant-current drive element so that the constant-current drive element keeps operating in the active region according to the amplified differential signal.

5. An electronic appliance comprising the apparatus of claim 1.

6. An electronic appliance comprising the apparatus of claim 2.

7. An electronic appliance comprising the apparatus of claim 3.

* * * * *